United States Patent
Dent

(10) Patent No.: US 7,184,492 B2
(45) Date of Patent: Feb. 27, 2007

(54) USING ANTENNA ARRAYS IN MULTIPATH ENVIRONMENT

(75) Inventor: Paul W. Dent, Pittsboro, NC (US)

(73) Assignee: Ericsson Inc., Plano, TX (US)

( * ) Notice: Subject to any disclaimer, the term of this patent is extended or adjusted under 35 U.S.C. 154(b) by 475 days.

(21) Appl. No.: 10/361,244

(22) Filed: Feb. 10, 2003

(65) Prior Publication Data

US 2004/0156443 A1   Aug. 12, 2004

(51) Int. Cl.
*H04L 27/04* (2006.01)

(52) U.S. Cl. .................................. 375/299; 375/267

(58) Field of Classification Search ................ 375/299, 375/267, 260

See application file for complete search history.

(56) References Cited

U.S. PATENT DOCUMENTS

| | | | |
|---|---|---|---|
| 3,917,998 A | 11/1975 | Welti | |
| 5,267,269 A | 11/1993 | Shih et al. | |
| 5,327,577 A | 7/1994 | Uddenfeldt | |
| 5,594,941 A | 1/1997 | Dent | |
| 5,619,503 A | 4/1997 | Dent | |
| 5,631,898 A | 5/1997 | Dent | |
| 5,642,358 A | 6/1997 | Dent | |
| 5,724,666 A | 3/1998 | Dent | |
| 5,812,935 A | 9/1998 | Kay | |
| 5,812,947 A | 9/1998 | Dent | |
| 5,845,199 A | 12/1998 | Longshore | |
| 5,848,060 A | 12/1998 | Dent | |
| 5,883,888 A | 3/1999 | St-Pierre | |
| 5,909,460 A | 6/1999 | Dent | |
| 5,930,248 A | 7/1999 | Langlet et al. | |
| 5,940,445 A | 8/1999 | Kamin, Jr. | |
| 5,940,742 A | 8/1999 | Dent | |
| 6,088,593 A | 7/2000 | Dent | |
| 6,104,933 A | 8/2000 | Frodigh et al. | |
| 6,331,898 B1 | 12/2001 | Yokoi et al. | |
| 6,400,780 B1 * | 6/2002 | Rashid-Farrokhi et al. | . 375/347 |
| 2001/0020917 A1 | 9/2001 | Hamada et al. | |

FOREIGN PATENT DOCUMENTS

EP   0877493   11/1998

(Continued)

OTHER PUBLICATIONS

Gerstacker W H et al: "An Efficient Method for Prefilter Computation for Reduced-State Equalization" Proceedings of 11th International Symposium on Personal, Indoor, and Mobile Radio Communication, vol. 1, Sep. 18-21, 2000, pp. 604-609, XP010520707 London, UK.

(Continued)

*Primary Examiner*—Kevin Kim
(74) *Attorney, Agent, or Firm*—Roger S. Burleigh

(57) ABSTRACT

The invention comprises using beamforming antenna to coherently transmit an information signal to a receiver using two or more directional beams. In one embodiment, the phase and timing of the information signals carried by each directional beams are adjusted such that the signals arrive synchronously at the mobile terminal. Time synchronization may be obtained by delaying signals transmitted on selected directional beams to compensate for different propagation delays, or by preconditioning and filtering the signals using a channel coefficient matrix.

22 Claims, 3 Drawing Sheets

FOREIGN PATENT DOCUMENTS

| EP | 1229669 | 8/2002 |
|----|---------|--------|
| WO | WO 9935763 | 7/1999 |
| WO | WO 0021201 | 4/2000 |
| WO | WO 0201732 | 1/2002 |

OTHER PUBLICATIONS

Kowalewski F et al: "Joint Predistortion Transmit Diversity" Globecom'00. 2000 IEEE Global Telecommunications Conference. San Francisco, CA, Nov. 27-Dec. 1, 2000. IEEE Global Telecommunications Conference, New York, NY: IEEE, US, vol. 1 of 3, Nov. 27, 2000, pp. 245-249, XP002202957 ISBN: 0-7803-6452-X.

Dent, "Communication System Employing Channel Estimation Loop-back Signals," Pub. No. US 2003/0045297 A1, Pub. Date Mar. 6, 2003.

Dent et al, "Mobile Station Loop-back Signal Processing," Pub. No. 2003/0036359 A1, Pub. Date Feb. 20, 2003.

Emre Telatar, "Capacity of Multi-antenna Gaussian Channels," Lucent Technologies, Bell Laboratories, Internal Tech. Memo, Jun. 1995.

G.J. Foschini and M.J. Gans, "On Limits of Wireless Communications in a Fading Environment when Using Multiple Antennas," Wireless Personal Communications, vol. 6, pp. 311-335, Kluwer Academic Publishers, 1998.

G.J. Foschini and R.A. Valenzuela, "Initial estimation of communication efficiency of indoor wireless channels," Wireless Networks 3, pp. 141-154, 1997.

* cited by examiner

USING ANTENNA ARRAYS IN MULTIPATH ENVIRONMENT

FIELD OF THE INVENTION

The present invention generally relates to wireless communication networks and more particularly to an inventive coherent diversity technique that improves communication performance and efficiency.

BACKGROUND OF THE INVENTION

A common problem to overcome in wireless communications is multipath fading, or simply fading. In a typical wireless communication system, multiple copies or multi-paths of a transmitted signal arrive at a receiver from different directions and with different time delays. The multipaths combine at the receiver to yield a resultant received signal that can vary greatly in amplitude and phase, making it difficult to detect and demodulate.

Diversity is a commonly used technique in wireless communication systems to combat fading. There are many forms of diversity, all with the same underlying idea, which is to provide redundant signals at the receiver over independently fading channels. If multiple copies of the same signal are received at the receiver, there is a good likelihood that at least one of the redundant signals will not be degraded by fading, or that the redundant signals can be combined to yield a signal suitable for demodulation.

One type of diversity is known as transmit diversity, wherein multiple copies of the same signal are transmitted using different frequencies, antennas, polarizations, or combinations thereof. When multiple transmitting elements are in relatively close proximity and form an array, the technique is known as coherent transmit beamforming. Patents related to coherent transmit beamforming include U.S. Pat. Nos. 6,088,593; 5,940,742; 5,909,460; 5,848,060; 5,812,947; 6,331,898; 5,619,503; 5,594,941; 5,642,358; and 5,594,941. Coherent transmit beamforming, as described in the above identified patents, assumes that the impulse response of the propagation paths from each antenna element to a given receiver are known to the base station. In "Mobile-Assisted Beamforming," which is described in the '941 patent, the mobile terminal provides feedback to the base station using a reverse communication channel to assist the base station in the determining channel estimates for the various propagation paths.

Another form of transmit diversity is variously known as simulcast, multicast, and transmit macro-diversity. Transmit macro-diversity employs multiple antennas widely separated from one another to transmit transmit signals to the same receiver. The propagation channel from each antenna to each receiver is a multipath channel having multiple propagation paths of different delay with time-varying amplitude and phase. Non-coherent macro-diversity increases the geographical spread of the interference from a given signal and reduces the reuse of the same channel. It nevertheless increases capacity over the capacity that is available without macro-diversity, as many receivers are located in the border regions between different transmitter service areas, when a uniform area distribution of receivers applies, and thus benefit from macro-diversity. Transmit macro-diversity is described more fully in U.S. Pat. Nos. 6,104,933; 5,940,445; 5,930,248; 5,883,888; 5,845,199; 5,724,666; 5,812,935; 5,327,577; and 3,917,998.

Non-coherent transmit macro-diversity is less effective than coherent beamforming in some important ways. Both coherent beamforming and non-coherent macro-diversity enhance the received signal by summing the transmitted powers of all cooperating transmit antennas or antenna elements. However, only coherent beamforming diminishes the interference transmitted in other directions and focuses the transmitted beam towards the receiver, providing additional antenna gain. With coherent beamforming, the same frequency channel may be re-employed in different directions without interference, increasing communications capacity. However, with traditional coherent beamforming, the receivers for which the same channel is re-employed must be spaced by more than the beamwidth of the transmission beam.

In addition to addressing fading issues, research has shown that wireless systems using multiple transmit antennas and multiple receive antennas can achieve high data rate capacity. The use of multiple antennas to increase data rate capacity is discussed in E. Telatar, *Capacity of Multi-antenna Gaussian Channels*, AT&T-Bell Labs Internal Tech. Memo, June 1995; G. J. Foschini and M. J. Gans, *On Limits of Wireless Communication in a Fading Environment When Using Multiple Antennas*, Wireless Personal Communications, vol. 6, (no.3), pp.311–35, Klu-wer Academic Publishers, March 1998; and G. J. Foschini, R. A. Valenzuela, *Initial Estimation of Communication Efficiency of Indoor Wire-less Channel*, Wireless Networks 3, pp. 141–154, 1997. These articles discuss methods used for increasing the data rate that can be provided to a signal receiver equipped with multiple antennas. Using a channel coefficient matrix that describes the propagation paths from each of N transmit antennas to each of N receive antennas, it is possible to provide N distinct communication channels. Each channel provides a basic data rate, thereby providing N times the basic data rate. The capacity gains can be achieved, however, only when the signals from the N receive antennas are available at a single location.

SUMMARY

The present invention discloses a method and apparatus for using antenna arrays in a multipath environment to communicate an information signal to a mobile terminal. A plurality of directional beams are formed by one or more directional beamforming antennas, each directional beam oriented in a different direction. A transmit signal generator derives a transmit signal for each selected directional beam from the information signal for transmission to the mobile terminal via the selected directional beams. The communication system compensates for differences in propagation delay between the selected directional beams such that the transmitted signals arrive time aligned at the mobile terminal.

DETAILED DESCRIPTION OF THE INVENTION

Figure 1:
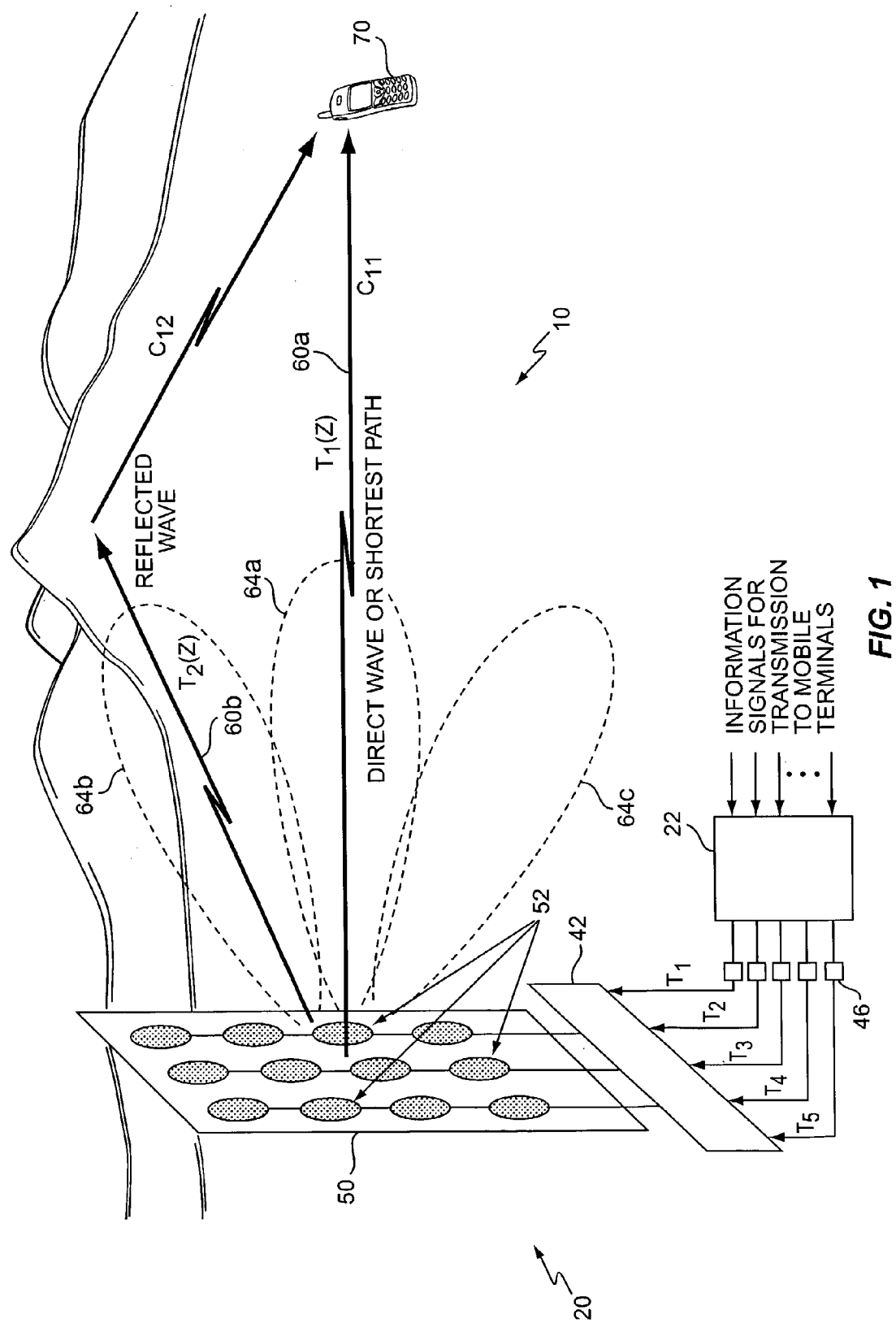
FIG. 1 illustrates a communication system according to the present invention.

FIG. 1 illustrates an exemplary wireless communication system 10 in which the present invention may be practiced.

The communication system 10 comprises one or more base stations 20 for communicating with a plurality of mobile terminals 70, though only one base station 20 and one mobile terminal 70 are shown in FIG. 1 for illustrative purposes. The base station 20 includes transmit signal generator 22, delay elements 46, beamformer 42 and a beamforming antenna 50 to generate multiple directional beams 64 separated in azimuth for transmitting signals to and receiving signals from the mobile terminals 70. While only one beamforming antenna 50 is shown in FIG. 1, the present invention may be practiced using two or more beamforming antennas located at different base stations or antenna sites.

As will be described in more detail below, the present invention uses two or more directional beams 64 to transmit an information signal to a particular mobile terminal 70 to provide transmit diversity. In one exemplary embodiment, beamforming antenna 50 comprises a circular array of antenna elements 52 arranged in columns and rows capable of generating multiple directional beams 64 in different azimuthal directions over 360°. A planar antenna array could also be used. Directional beams 64 may be fixed in azimuth and overlap, for example, at their 3 dB points. The elevation of the directional beams 64 may be fixed, for example, at zero degrees or, as is common in cellular systems, with a slight depression from the horizontal plane. The number of directional beams 64 may be greater or lesser than the number of columns in the antenna array.

Beamformer 42 includes an input for each directional beam 64 and generates antenna drive signals for beamforming antenna 50. The beamformer 42 may comprises a passive Butler matrix for a planar antenna array, or the equivalent for a circular antenna array. Since beamformers and beamforming techniques are known, detailed discussion of beamformers and beamforming techniques is omitted. However, the interested reader is directed to U.S. Pat. Nos. 6,088,593; 5,940,742; 5,909,460; 5,848,060; 5,812,947; 6,331,898; 5,619,503; 5,594,941; 5,642,358, and 5,594,941, which are incorporated herein by reference.

Transmit signal generator 22 generates the transmit signals, denoted $T_N$, which are transmitted to the mobile terminals 70 over respective directional beams 64. The transmit signal generator 22 may comprise, for example, a conventional digital modulator that performs channel coding, error-correction coding, and digital modulation in a conventional manner. Transmit signal generator 22 may further comprise combining and filtering circuits to precombine and prefilter the information signals to achieve coherent macro-diversity as described in U.S. patent application Ser. No. 915,896 (the '896 patent application) entitled "Communication System Employing Transmit Macro-Diversity" filed 26 Jul. 2001 to Applicant, which is incorporated herein by reference.

The transmit signals output from the transmit signal generator 22 are applied to respective inputs of the beamformer 42. Delay elements 46 may be interposed between the outputs of the transmit signal generator 22 and the inputs of the beamformer 42 to delay selected transmit signals so that the transmit signals for the same mobile terminal 70 will arrive time-aligned at the mobile terminal 70. The function of the delay elements 46 could also be incorporated into the transmit signal generator 22. Therefore, separate delay elements are not needed in some embodiments of the invention, which will become more apparent in the following portions of the description.

A controller 30, which may comprise a processor and memory for program storage, controls the transmit signal generator 22, beamformer 42, and delay elements 46 (when present). The operations of the controller 30 are described in more detail below.

As shown in FIG. 1, the propagation channel from beamforming antenna 50 to a given mobile terminal 70 comprises multiple propagation paths 60. In this context, the term propagation channel refers to the transmission path between the base station 20 and the mobile terminal 70, which may be a multipath channel having many propagation paths 60. It is assumed that at least some of the multiple propagation paths 60 are sufficiently angularly separated at the antenna 50 that they can be discriminated. In other words, the angular separation is such that the propagation paths 60 correspond to two or more distinct beam directions. FIG. 1 illustrates two such propagation paths, 60*a* and 60*b*, from antenna 50 to mobile terminal 70. While FIG. 1 illustrates only two distinct propagation paths 60, it should be understood that there may be additional propagation paths 60. Further, it should be understood that each propagation path 60 may correspond to a directional beam 64 originating from a single antenna 50 or from multiple antennas 50 located at different base stations 20. Propagation path 60*a* is a direct path with a time delay $t_1$, while propagation path 60*b* is an indirect path with a different time delay $t_2$. Paths 60*a* and 60*b* each correspond to a respective beam 64 and fade independently as the mobile terminal 70 moves, so that one path 60 or beam 64 may be optimum at a given instant and a different path 60 or beam 64 may be optimum at a different instant.

In a conventional communication system 10, base station 20 communicates with a given mobile terminal 70 using a single beam 64. Ideally, base station 20 would chose the beam 64 exhibiting the lowest path loss for communication with mobile terminal 70. Base station 20 could monitor the path loss associated with different beams 64 and dynamically change beams 64 used for communication with the mobile terminal 70 as the path loss varies. This process is referred to herein as path selection or beam selection. Techniques for determining path loss and estimating channels are well-known in the art and are not described herein in detail.

If base station 20 switches from a first directional beam 64*a* (corresponding to a first propagation path 60*a*) to a second directional beam (corresponding to a second propagation path) during transmission, the signal received at mobile terminal 70 will undergo a phase, amplitude and delay discontinuity at the instant the propagation path changes. This discontinuity may be tolerable if the switch is made at appropriate points in the transmitted waveform, for example in guard bands between TDMA slots, during or just prior to transmission of a known syncword, etc. In the latter case, transmission of a syncword just after changing beams 64 allows mobile terminal 70 to acquire phase and timing anew. If the path delay is fed back to base station 20 from mobile terminal 70 using a reverse channel, base station 20 could advance or retard transmissions upon changing the path selection so that the signal is received at mobile terminal 70 without a timing discontinuity.

When beams 64 are selected according to the above described method, the received signal at mobile terminal 70 is the greater of the path amplitudes. For example, assume that the amplitude of the signal transmitted through propagation path 60*a* is $A_1$ and the amplitude of the signal transmitted through propagation path 60*b* is $A_2$. If path selection is used as described above, the signal amplitude received by mobile terminal 70 will be the larger of $A_1$ or $A_2$. This is obviously useful in mitigating fading. According to one embodiment of the present invention, further improvement may be realized by transmitting a portion of the total transmit power allocated to a given mobile terminal 70 on two or more beams 64. In one exemplary embodiment, the phase and time delay of the signal transmitted on at least one beam 64 is modified before transmission so that the signals transmitted over all beams 64 add coherently at mobile terminal 70. For example, pre-weighting the signal transmitted via beam 64a by a factor $A_1^*$ and pre-weighting the signal transmitted via beam 64b by a factor $A_2^*$, where * denotes the conjugate of $A_1$ and $A_2$, respectively, generates a signal at mobile terminal 70 with an amplitude equivalent to $|A_1|^2+|A_2|^2$. To keep the transmitted power constant, divide the transmitted signal amplitudes by $$\sqrt{|A_1|^2 + |A_2|^2}$$

before transmission so that the received amplitude is then also $$\sqrt{|A_1|^2 + |A_2|^2}$$

and the received power is $|A_1|^2+|A_2|^2$, as opposed to the larger of $|A_1|^2$ or $|A_2|^2$.

In addition, if the selected propagation paths 60 or beams 64 have different delays, then the signals transmitted via beam 64a with relatively shorter propagation delays should be delayed to arrive simultaneously with the signal transmitted via beam 64b with the longest delay. Continuing with the example in FIG. 1, assuming that the time delay $t_2$ associated with path 60b is longer than the time delay to associated with beam 64a, the base station 20 would delay the transmission of the signal via beam 64a by the difference $t_2-t_1$. Alternatively, the signal transmitted via beam 64a could be delayed by an amount $t_2$ and the signal via beam 64b could be delayed by an amount $t_1$, so that the total delay for both beams 64 equals $t_1+t_2$ and thus arrive synchronously and coherently at mobile terminal 70. Delay elements 46 may be interposed between the outputs of transmit signal generator 22 and beamformer 42 to implement the required delays as shown in FIG. 1. Alternatively, the transmit signal generator 22 may implement the desired delay as described below.

Angularly separable paths 60 corresponding to each beam direction 64 may be considered multipath channels in their own right, since each directional beam 64 will encompass multiple propagation paths 60 that are not separated sufficiently to discriminate between them. In effect, two distinct propagation paths 60 corresponding to different beam directions may be regarded as distinct propagation channels from separate antennas. Viewed in this manner, the methods described in my previously mentioned patent application entitled "Communication System Employing Transmit Macro-Diversity" (the '896 patent application) can be employed to achieve signal synchronization and coherency.

As described in the '896 patent application, an information signal for a given mobile terminal 70 is contained in two or more transmit signals, $T_N$, transmitted from two or more spatially separated antennas. When multiple mobile terminals 70 are involved, each transmit signal comprises a weighted combination of the information signals for each of the mobile terminals 70. The weighting, based on the propagation channels between each respective antenna and each mobile terminal 70, is designed to cause reinforcement of the wanted signal at each mobile terminal 70 and cancellation of the unwanted signals. That is, the various transmit signals combine at each mobile terminal 70 to cancel all but the desired signal for the target mobile terminal 70.

In the '896 patent application, the propagation channel from each antenna 50 to each mobile terminal 70 is represented by a z-polynomial that describes the attenuation, phase and delay characteristics of the propagation channel. Thus, a propagation channel $C_{jk}$ may be represented by the channel coefficient polynomial or z-polynomial $c_0+c_1z^{-1}+c_2z^{-2}+\ldots c_{n-1}z^{-(n-1)}$, where $c_x$ represents the channel coefficient associated with a single multipath from antenna k to mobile terminal j and $z^y$ is a delay operator that represents the unit delay of the various multipaths relative to the first received multipath. Similarly, each directional beam 64 can be viewed as a separate propagation channel denoted $C_{jk}$ and can be represented by a z-polynomial. In this case, the index k represents the directional beam 64. In the example of FIG. 1, the directional beam 64a corresponding to propagation path 60a is denoted $C_{11}$, and directional beam 64b corresponding to propagation path 60b is denoted as $C_{12}$. For purposes of explanation, assume that $C_{11}$ is a 3-ray multipath channel described by the z-polynomial $c_{10}+c_{11}z^{-1}+c_{12}z^{-2}$ and $C_{12}$ is a two-ray multipath channel described by the z-polynomial $c_{20}+c_{21}z^{-1}$. These expressions assume that coefficients $c_{10}$ and $c_{20}$ refer to the same reference propagation delay, which is usually (though not necessarily) the propagation delay for the shortest propagation path associated with that directional beam 64. If the two directional beams 64a, 64b have different reference propagation delays (i.e., the delays of the shortest propagation paths are different), the z-polynomials need to take into account the difference. Assuming that the difference is, for example, four sample periods with propagation channel $C_{11}$ having the greater delay, the channel coefficient polynomial for propagation channel $C_{11}$ corresponding to beam 64a should be written as $c_{10}z^{-4}+c_{11}z^{-5}+c_{12}z^{-6}$. When practicing the present invention, the channel coefficient polynomials represent the channel form the input of the beamformer 42 to the mobile terminal 70.

As disclosed in the '896 patent application, multiple propagation channels between $N_1$ antennas 50 and $N_2$ mobile terminals 70 may be represented by a channel coefficient matrix C(z), where each element of the matrix is a z-polynomial corresponding to one propagation channel $C_{jk}$ between a given antenna 50 and a given mobile terminal 70. The channel coefficient matrix C(z) has $N_2$ rows and $N_1$ columns. Each z-polynomial in the channel coefficient matrix C(z) should reference the same base delay as described above. In the exemplary case of two directional beams 64a, 64b communicating with one receiver, $N_1=2$ and $N_2=1$. In the example given, the channel coefficient matrix C(z) is:

$$C(z) = [\, C_{11}(z) \quad C_{12}(z) \,] \qquad\qquad \text{(Eq. 1)}$$
$$= [\, c_{10}z^{-4} + c_{11}z^{-5} + c_{12}z^{-6} \quad c_{20} + c_{21}z^{-1} \,]$$

Denoting the transmit signals transmitted over each directional beam 64a, 64b to mobile terminal 70 as $T_1(z)$ and $T_2$ (z) respectively, the received signal R(z) may be expressed in terms of the transmitted signals $T_1(z)$ and $T_2(z)$ by the following matrix equation:

$$R(z) = C(z) \cdot \begin{bmatrix} T_1(z) \\ T_2(z) \end{bmatrix} \quad \text{(Eq. 2)}$$

$$= [C_{11}(z) \quad C_{12}(z)] \cdot \begin{bmatrix} T_1(z) \\ T_2(z) \end{bmatrix}$$

In the '896 application, it was also shown that, for optimum transmission of a symbol/sample sequence S(z), the transmitted signals $T_1(z)$ and $T_2(z)$ should be $$\begin{bmatrix} T_1(z) \\ T_2(z) \end{bmatrix} = [C(z)]^{\#} \cdot S(z) \quad \text{(Eq. 3)}$$

where the $[C(z)]^{\#}$ indicates a time-reversed, conjugate transpose of the channel coefficient matrix, and S(z) is the information signal transmitted to mobile terminal 70. Channel coding and error-correction coding is typically performed on the individual information signals prior to filtering with the time reverse conjugate transpose of the channel coefficient matrix to generate the transmit signals. For the purposes of time-reversal in the above example, channel coefficient polynomials $C_{11}(z)$ and $C_{12}(z)$ have the channel coefficients shown in Table 1.

TABLE 1

COEFFICIENTS FOR $C_{11}(z)$ AND $C_{12}(z)$

| | $z^0$ | $z^{-1}$ | $z^{-2}$ | $z^{-3}$ | $z^{-4}$ | $z^{-5}$ | $z^{-6}$ |
|---|---|---|---|---|---|---|---|
| $C_{11}$: | 0 | 0 | 0 | 0 | $c_{10}$ | $c_{11}$ | $c_{12}$ |
| $C_{12}$: | $c_{20}$ | $c_{21}$ | 0 | 0 | 0 | 0 | 0 |

Therefore, the time-reversed conjugate polynomials are as shown in Table 2, where it is clear that the extra delay of four sample periods for propagation channel $C_{11}$ has been switched to the channel polynomial for propagation channel $C_{12}$. The information signal is filtered or conditioned prior to transmission using the filter coefficients in Table 2, thus achieving the desired time synchronization of signals propagating over the two directional beams 64a, 64b.

TABLE 2

TIME-REVERSED CONJUGATE POLYNOMIALS

| | $z^0$ | $z^{-1}$ | $z^{-2}$ | $z^{-3}$ | $z^{-4}$ | $z^{-5}$ | $z^{-6}$ |
|---|---|---|---|---|---|---|---|
| $C_{11}^{\#}$: | $c^*_{12}$ | $c^*_{11}$ | $c^*_{10}$ | 0 | 0 | 0 | 0 |
| $C_{12}^{\#}$: | 0 | 0 | 0 | 0 | 0 | $c^*_{21}$ | $c^*_{20}$ |

The discussion above has assumed that antenna 50 is transmitting to a single mobile terminal 70. The method could also be used to transmit signals to multiple mobile terminals 70 from a single beamforming antenna 50. When transmitting signals to multiple mobile terminals 70, the information signal vector S(z) would contain each information signal being transmitted to each mobile terminal 70.

The method described above may be used to coherently synchronize any number of propagation paths 60 from antenna 50 to mobile terminal 70, even when they are not distinctly separable in angle. This may be accomplished by treating each antenna element 52 as a separate antenna characterized by its own distinct channel coefficient polynomial $C_{jk}(z)$, and to pre-filter signals for transmission separately for each antenna element 52 using the time reverse conjugate transpose $C_{jk}(Z)^{\#}$ of the channel coefficient matrix C(z) as previously described.

Interference cancellation, including cancellation of intersymbol interference (ISI), may also be achieved by multiplying the transmit signals by the inverse matrix $[C(z) \cdot C^{\#}(z))]^{-1}$ if desired. As explained in the '896 application, the inverse matrix may be replaced by the adjoint matrix if the determinant polynomial has roots close to the unit circle. The signals may also be pre-filtered by an infinite impulse response (IIR) filter composed only of those factors of the determinant polynomial having roots well inside the unit circle, and filtered in time-reversed order (i.e. by passing a block of samples backwards through the filter) by an IIR filter having the reciprocals of roots well outside the unit circle. By omitting the roots close to the unit circle, ISI is not completely cancelled, leaving some ISI to be handled by equalizers at the mobile terminal 70.

Because signals are pre-defined for all antenna elements 52, even when the number of angularly separated beams 64 to mobile terminal 70 is less than the number of antenna elements 52, considering only angularly separable propagation paths 60 (i.e., distinct beams 64) may be more practical than treating each antenna element 52 as a separate antenna. Treating each antenna element 52 as a separate entity, while within the scope of the present invention, would require determination of a separate channel coefficient polynomial for the propagation channel from each antenna element 52 to each mobile terminal 70. In contrast, the number of azimuthal directions or beams 64 in which significant propagation to a mobile terminal 70 occurs is expected to be smaller than the number of antenna elements 52, and may be only in the range of 1 to 3. Thus, the number of channel coefficient polynomials to be determined for each mobile terminal 70 is reduced to one set per utilized beam 64 instead of one set for each antenna element 52.

Techniques for determining channel coefficients are well-known in the art and are not described herein in detail. U.S. patent application Ser. No. 09/939,006 entitled Communication System Employing Channel Estimation Loop-Back Signals filed on Aug. 24, 2001, and Ser. No. 10/135,095, entitled Mobile Station Loop-Back Signal Processing filed on Apr. 30, 2002, which are incorporated herein by reference, describe a techniques for using loopback signals from the mobile terminals 70 to determine channel coefficients for a downlink channel to a mobile terminal 70. The application entitled Transmit Diversity and Separating Multiple Loop-back Signals filed concurrently with this application discloses similar techniques for using loopback signals to determine channel coefficients and is likewise incorporated herein by reference. Channel coefficients from the transmitter inputs to mobile terminal 70 may be determined using the loopback approach disclosed in these applications.

Figure 2:
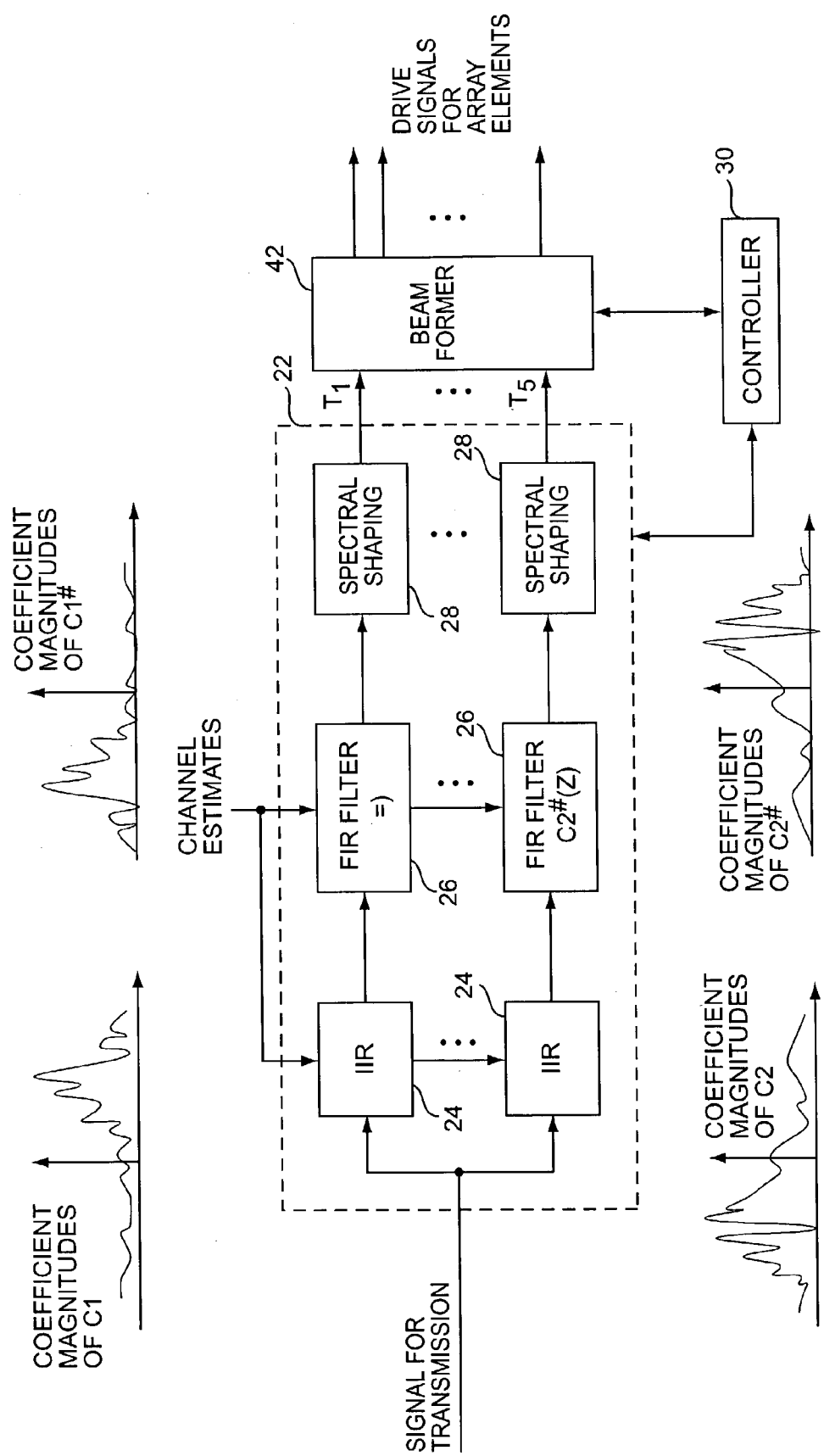
FIG. 2 illustrates an exemplary transmitting system according to the present invention.

FIG. 2 illustrates an exemplary transmit signal generator 22 in more detail, which may be implemented using one or more digital signal processors. Transmit signal generator 22 includes a set of finite impulse response (FIR) filters 26 and spectral shaping filters 28 for each directional beam 64. Transmit signal generator 22 may also include a set of IIR filters 24. An information signal is preconditioned for transmission using multiple beams 64 by passing it through corresponding IIR filters 24 and FIR filters 26. As noted above, channel coding and error-correction coding may be performed for each information signal prior to filtering as described below. The IIR filters 24 filter the information signals using the inverse matrix or adjoint matrix as earlier described to compensate for intersymbol interference. The FIR filters 26 filter the information signals such that interfering signals from other mobile terminals 70 cancel at the target mobile terminal 70. Each FIR filter 26 has an impulse response that is the time-reverse-conjugate of the channel coefficient matrix C(z) for the respective beam 64. The FIR filter 26 is typically described by a number of coefficients that are used to weight delay versions of the information signal tapped out of a delay line or memory in delay steps of one transmit symbol period. Spectral shaping filters 28 define the transmit power spectrum and limit adjacent channel energy. Spectral shaping filters 28 typically up-sample the filtered signal from FIR filters 26 so that the sample rate at their outputs is a multiple of the sample rate at their inputs.

The transmit signals output from spectral shaping filters 28 are then applied to beamformer 42. In the case of a digital beamformer 42, the chosen coefficients determine the directions of beams 64. Therefore, it is not necessary to select which beamformer inputs are used to select a given beam 64, but rather, it is necessary to select the coefficients to be used for the given input. Beamformer 42 computes antenna drive signals for multiple antenna elements 52 using known beamforming techniques.

Conversion from numerical samples to analog waveforms, upconversion and amplification may occur at different places. For example, when a digital beamformer 42 is used, D/A conversion, upconversion to the radio channel frequency, and amplification to a transmit power level for each antenna element 52 may occur after beamforming. However, those skilled in the art will recognize that because filters 24, 26, 28 and beamformer 42 all perform linear operations, they may be connected in any order. For example, beamformer 42 may receive at its input the outputs of filters 24, 26 and spectral shaping filters 28 may be placed after beamformer 42 on each of its outputs. The number of spectral shaping filters 28 is then greater, however the beamformer 42 is reduced in complexity due to operating only at one sample per symbol. Alternatively, spectral shaping filters 28 may precede FIR filters 26. However, FIR filters 26 then need to operate at the elevated sample rate output from spectral shaping filters 28. This may be desired if FIR filters 26 form fractional-symbol delays. Alternatively, the spectral shaping filters 28 can include upconverting to a radio channel frequency. In this case, the beamforming operates on the RF signal, i.e. analog beamforming using for example a Butler matrix. Beamformer 42 cannot however precede FIR filters 26 because FIR filters 26 operate on "beams" 44 rather than individual antenna elements 52, according to the present invention.

Figure 3:
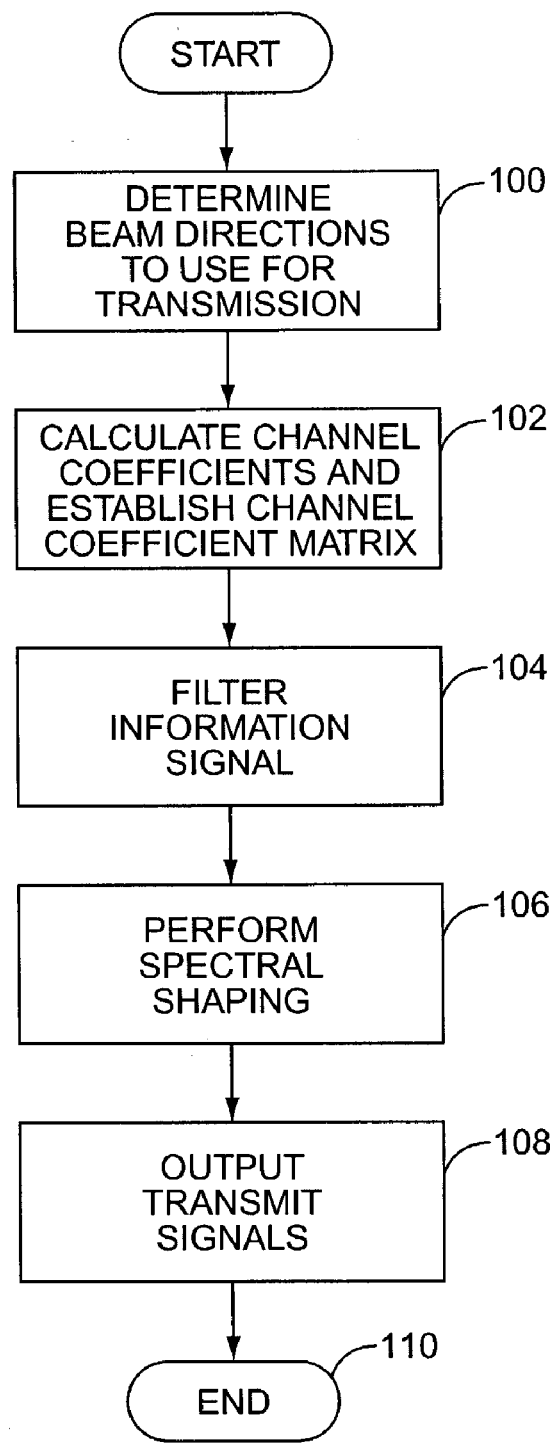
FIG. 3 illustrates an exemplary communication initiation procedure according to the present invention.

FIG. 3 illustrates an exemplary communications initiation procedure used by base station 20 to practice the present invention. At block 100, controller 30 determines the number and direction of beams 64 that will be used for communication with each mobile terminal 70. The beam selection logic could be incorporated into the transmit signal generator 22. Typically, the selected beams 64 for each mobile terminal 70 will include the path with the lowest path loss to the target mobile terminal 70. Selection of the beams 64 may be based on signals received at the base station 20 from mobile terminals 70. For example, base station 20 may receive signals from a mobile terminal 70 on a plurality of beams 64 and select those beams that provide the strongest signal for transmission to mobile terminal 70.

At block 102, transmit signal generator 22 creates a channel coefficient matrix from channel estimates from a channel estimator (not shown). At blocks 104 and 106, the transmit signal generator 22 generates transmit signals using a channel coefficient matrix C(z) as previously described. The transmit signals, $T_N$, are then output to the beamformer 42 at step 108 and the process ends (block 110).

If the same antenna 50 is used for communicating with more than one mobile terminal 70 using different beams 64 for each mobile terminal 70, transmit signal generator 22 generates transmit signals from the information signals for each mobile terminal 70. In particular, if communication to several mobile terminals 70 using the same frequency at the same time is desired, transmit signal generator 22 will form transmit signals for all beams 64 by using channel coefficient matrix C(z) to achieve signal separation at each mobile terminal 70. By limiting transmissions to the mobile terminals 70 to distinct beams, the channel coefficient matrix C(z) used by transmit signal generator 22 can be reduced as compared to the channel coefficient matrix C(z) based on individual antenna elements 52. That is, the number of distinct beams 64 will typically be less than the number of antenna elements 52. Thus the number of channel coefficient polynomials to be determined and updated by loopback or other means is reduced. Moreover, by limiting transmissions to the mobile terminals 70 to distinct beams 64, the channel coefficient matrix C(z) may be partitioned into sets of mobile terminals 70 that are adequately separated by the array directivity. By partitioning the channel coefficient matrix C(z), the interfering signals requiring separation by interference cancellation is reduced.

In the example illustrated in FIG. 1, mobile terminal 70 is only reached with any significance by two beams, namely beam 64*a* and beam 64*b*. In an exemplary embodiment, these selected beam directions may remain fixed during a communications session. In this embodiment, the relative energy transmitted in each beam 64*a* and 64*b* may be dynamically adapted to the independent fading of each beam 64*a* and 64*b*.

In another exemplary embodiment, base station 20 may continue to monitor the strength of signals received by antenna 50 on a plurality of candidate beams 64, as well as the beams currently being used. If base station 20 determines that a candidate beam 64*c* provides a better communication link to mobile terminal 70 than beam 64*b*, base station 20 may dynamically switch communication from beam 64*b* to the candidate beam 64*c* to improve signal reception at mobile terminal 70.

Multiple information signals for multiple mobile terminals 70 may be conditioned and transmitted using the same antenna 50. In the case of multiple information signals for multiple mobile terminals 70, FIR filters 26 for each information signal filter each information signal. In the case of overlapping CDMA signals, the transmit signals output from the transmit signal generator 22 applied to the same beam 64 may be added together. For example, if signal 1 is to be transmitted using beams 64*a* and 64*b*, and signal 2 is to be transmitted using beams 64*b* and 64*c*, then the sum of the transmit signals 1 and 2 would be applied to beam 64*b*. Spectral shaping may be applied after summing when the signals are on the same frequency channel.

Those skilled in the art will further appreciate that the invention may be extended to using beams 64 from more than one antenna 50 located at different antenna sites. If for example a service area is covered by a number of antenna sites, each using a cylindrical beamforming antenna 50 to form beams in any azimuthal direction, then in general, a mobile terminal 70 lying within the triangle formed from the three closest sites may be reached using an appropriate beam direction from all three sites. By characterizing the propagation channels for the selected beams 64 from each of the three antenna sites, a coherent macro-diversity transmission scheme as described in the '896 patent application is realized. In this case, a single transmit signal generator 22 could generate the transmit signals applied to the beamformers 42 at each separate antenna site.

Thus, it has been shown that the operation of an antenna 50 for communicating with one or more mobile terminals 70 using directional beams 64 can be improved by using more than one directional beam 64 to communicate with each mobile terminal 70. The multiple beams 64 used to communicate with mobile terminal 70 may be selected from the beams 64 that can be formed using a single antenna 50 at a single site or from the beams 64 that can be formed using antennas 50 at different sites. When beams 64 may be continuously and dynamically selected from any site according to which have the lowest path attenuation to the mobile terminal 70, it may be seen that the traditional "handoff" mechanism for selecting the best site to serve a particular mobile terminals 70 may be dispensed with, as the function of tracking the mobile terminals 70 is fulfilled more advantageously when practicing the above invention.

The foregoing description and drawings describe and illustrate the present invention in detail. However, the foregoing disclosure only describes some embodiments. Therefore, the present invention embraces all changes and modifications that come within the meaning and equivalency range of the appended claims.

What is claimed is:

1. A method of transmitting an information signal to a first mobile terminal comprising:
   forming a plurality of directional beams, each directional beam oriented in a different direction and having a propagation delay;
   selecting two or more directional beams to use for transmitting the information signal to the first mobile terminal;
   for each selected directional beam, generating a transmit signal derived from the information signal for transmission to the first mobile terminal;
   transmitting the transmit signals to the first mobile terminal over respective ones of the selected directional beams; and
   compensating for differences in propagation delay between the selected directional beams such that the transmit signals arrive time aligned at the first mobile terminal;
   wherein compensating for differences in propagation delay between the selected directional beams comprises delaying transmit signals transmitted on at least one of the selected directional beams; and,
   wherein forming a transmit signal for a selected directional beam comprises:
   determining a channel coefficient polynomial describing the estimated amplitude and phase attenuation associated with the selected directional beam; and
   prefiltering the information signal using the channel coefficient polynomial.

2. The method of claim 1 wherein prefiltering the information signal using the channel coefficient polynomial comprises prefiltering the information signal with a time reverse conjugate of the channel coefficient polynomial.

3. The method of claim 2 wherein the channel coefficient polynomial includes complex coefficients encoding phase and amplitude attenuation associated with the directional beam and propagation delay values.

4. The method of claim 3 wherein compensating for differences in propagation delay between the selected directional beams such that the transmit signals arrive time aligned at the first mobile terminal comprises adjusting the propagation delay values in the channel coefficient polynomial to compensate for the differences in propagation delay between selected directional beams.

5. The method of claim 2 wherein forming a transmit signal for a selected directional beam further comprises filtering the information signals using a pulse shaping filter.

6. The method of claim 1, wherein forming a transmit signal for a selected directional beam comprises pre-filtering the information signal in a transmit signal generator to compensate for inter-symbol interference in the selected directional beams.

7. The method of claim 1, wherein forming a transmit signal for a selected directional beam comprises pre-filtering the information signal in a transmit signal generator to compensate for interference between the at least two directional beams.

8. A method of transmitting an information signal to a first mobile terminal comprising:
   forming a plurality of directional beams, each directional beam oriented in a different direction and having a propagation delay;
   selecting two or more directional beams to use for transmitting the information signal to the first mobile terminal;
   for each selected directional beam, generating a transmit signal derived from the information signal for transmission to the first mobile terminal;
   transmitting the transmit signals to the first mobile terminal over respective ones of the selected directional beams; and
   compensating for differences in propagation delay between the selected directional beams such that the transmit signals arrive time aligned at the first mobile terminal;
   wherein selecting at two or more directional beams to use for transmitting an information signal to the first mobile terminal comprises estimating path loss associated with the plurality of directional beams and selecting directional beams from the plurality of directional beams based on the estimated path loss.

9. A method of transmitting an information signal to a first mobile terminal comprising:
   forming a plurality of directional beams, each directional beam oriented in a different direction and having a propagation delay;
   selecting two or more directional beams to use for transmitting the information signal to the first mobile terminal;
   for each selected directional beam, generating a transmit signal derived from the information signal for transmission to the first mobile terminal;
   transmitting the transmit signals to the first mobile terminal over respective ones of the selected directional beams; and compensating for differences in propagation delay between the selected directional beams such that the transmit signals arrive time aligned at the first mobile terminal;
   wherein selecting at two or more directional beams to use for transmitting an information signal to the mobile terminal comprises measuring the strength of signals received from the first mobile terminal on the plurality of directional beams and selecting directional beams from the plurality of directional beams based on the strength of the received signals.

10. A method of transmitting an information signal to a first mobile terminal comprising:
forming a plurality of directional beams, each directional beam oriented in a different direction and having a propagation delay;
selecting two or more directional beams to use for transmitting the information signal to the first mobile terminal;
for each selected directional beam, generating a transmit signal derived from the information signal for transmission to the first mobile terminal;
transmitting the transmit signals to the first mobile terminal over respective ones of the selected directional beams; and
compensating for differences in propagation delay between the selected directional beams such that the transmit signals arrive time aligned at the first mobile terminal;
wherein selecting at two or more directional beams to use for transmitting an information signal to the first mobile terminal comprises:
estimating multi-path propagation channel characteristics between the transmitter and the first mobile terminal for the plurality of directional beams; and
choosing the selected directional beams based on the estimated multipath propagation channel characteristics.

11. The method of claim 10 wherein estimating multipath propagation channel characteristics comprises determining the multipath channel characteristics based on a loopback signal from the first mobile terminal.

12. A method of transmitting an information signal to a first mobile terminal comprising:
forming a plurality of directional beams, each directional beam oriented in a different direction and having a propagation delay;
selecting two or more directional beams to use for transmitting the information signal to the first mobile terminal;
for each selected directional beam, generating a transmit signal derived from the information signal for transmission to the first mobile terminal;
transmitting the transmit signals to the first mobile terminal over respective ones of the selected directional beams; and
compensating for differences in propagation delay between the selected directional beams such that the transmit signals arrive time aligned at the first mobile terminal;
further comprising reselecting at least one directional beam responsive to path loss variations.

13. A communication system to transmit an information signal to a first mobile terminal comprising:
one or more beamforming antennas to form a plurality of directional beams, each directional beam oriented in a different direction and having a propagation delay, where each beamforming antenna comprises a plurality of antenna elements;
a controller to select two or more directional beams from at least one beamforming antenna for transmitting the information signal to the first mobile terminal;
a transmit signal generator coupled to each of said beamforming antenna and said controller to derive a transmit signal from the information signal for each selected directional beam; and
a delay element to compensate for differences in propagation delay between the selected directional beams such that the transmit signals arrive time aligned at the first mobile terminal;
wherein the delay element compensates for differences in the propagation delay between the selected directional beams by delaying the transmit signal on at least one of the selected directional beams; and,
wherein the transmit signal generator determines a channel coefficient polynomial describing the estimated amplitude and phase attenuation associated with the selected directional beams.

14. The communication system of claim 13 wherein the delay element adjusts the propagation delay in the channel coefficient polynomial to compensate for the differences in propagation delay between selected directional beams.

15. The communication system of claim 13 wherein the transmit signal generator includes a filter to pre-filter the information signal using the channel coefficient polynomial.

16. The communication system of claim 15 wherein the filter comprises a finite impulse response filter to pre-filter the information signal with a time reverse conjugate of the channel coefficient polynomial.

17. The communication system of claim 16 wherein the channel coefficient polynomial determined by the transmit signal generator further includes complex coefficients encoding phase and amplitude attenuation associated with the directional beams and propagation delay.

18. A communication system to transmit an information signal to a first mobile terminal comprising:
one or more beamforming antennas to form a plurality of directional beams, each directional beam oriented in a different direction and having a propagation delay, where each beamforming antenna comprises a plurality of antenna elements;
a controller to select two or more directional beams from at least one beamforming antenna for transmitting the information signal to the first mobile terminal;
a transmit signal generator coupled to each of said beamforming antenna and said controller to derive a transmit signal from the information signal for each selected directional beam; and
a delay element to compensate for differences in propagation delay between the selected directional beams such that the transmit signals arrive time aligned at the first mobile terminal;
wherein the controller estimates path loss associated with the plurality of directional beams and selects directional beams from the plurality of directional beams based on the estimated path loss.

19. A communication system to transmit an information signal to a first mobile terminal comprising:
one or more beamforming antennas to form a plurality of directional beams, each directional beam oriented in a different direction and having a propagation delay, where each beamforming antenna comprises a plurality of antenna elements;
a controller to select two or more directional beams from at least one beamforming antenna for transmitting the information signal to the first mobile terminal;

a transmit signal generator coupled to each of said beamforming antenna and said controller to derive a transmit signal from the information signal for each selected directional beam; and a delay element to compensate for differences in propagation delay between the selected directional beams such that the transmit signals arrive time aligned at the first mobile terminal;

wherein the controller measures the strength of signals received from the first mobile terminal on the plurality of directional beams and selects directional beams from the plurality of directional beams based on the strength of the received signals.

20. A communication system to transmit an information signal to a first mobile terminal comprising:

one or more beamforming antennas to form a plurality of directional beams, each directional beam oriented in a different direction and having a propagation delay, where each beamforming antenna comprises a plurality of antenna elements;

a controller to select two or more directional beams from at least one beamforming antenna for transmitting the information signal to the first mobile terminal;

a transmit signal generator coupled to each of said beamforming antenna and said controller to derive a transmit signal from the information signal for each selected directional beam; and a delay element to compensate for differences in propagation delay between the selected directional beams such that the transmit signals arrive time aligned at the first mobile terminal;

wherein the controller estimates multi-path propagation channel characteristics between the transmitter and the first mobile terminal for the plurality of directional beams and chooses the selected directional beams based on the estimated multi-path propagation channel characteristics.

21. The communication system of claim 20 wherein the controller estimates the multipath propagation channel characteristics by determining the multi-path channel characteristics based on a loopback signal from the first mobile terminal.

22. A communication system to transmit an information signal to a first mobile terminal comprising:

one or more beamforming antennas to form a plurality of directional beams, each directional beam oriented in a different direction and having a propagation delay, where each beamforming antenna comprises a plurality of antenna elements;

a controller to select two or more directional beams from at least one beamforming antenna for transmitting the information signal to the first mobile terminal a transmit signal generator coupled to each of said beamforming antenna and said controller to derive a transmit signal from the information signal for each selected directional beam; and a delay element to compensate for differences in propagation delay between the selected directional beams such that the transmit signals arrive time aligned at the first mobile terminal;

wherein the controller further reselects at least one directional beam responsive to path loss variations.

* * * * *